No. 649,066. Patented May 8, 1900.
P. G. MEHLIN.
PIANO.
(Application filed Oct. 17, 1899.)
(No Model.) 2 Sheets—Sheet 1.
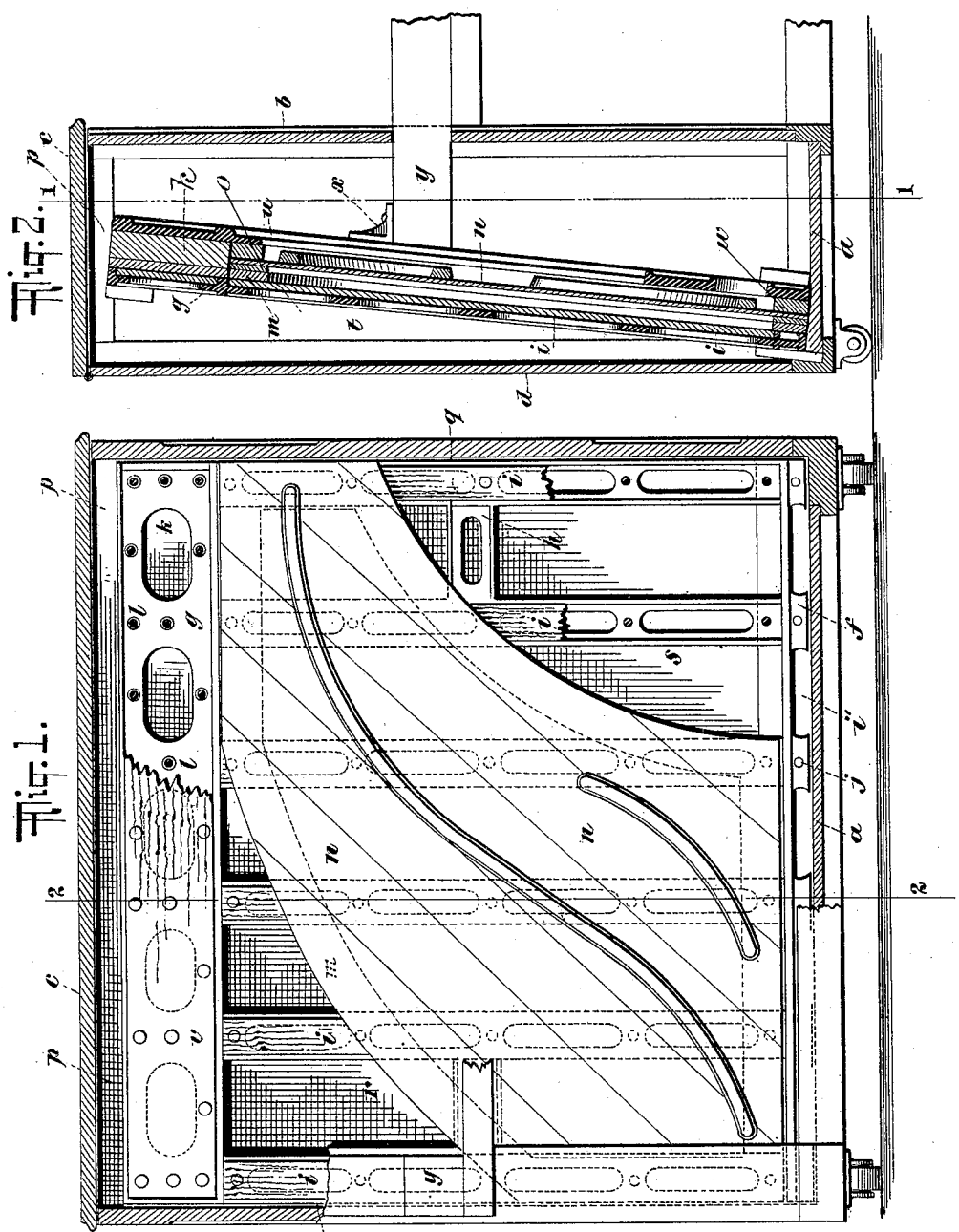
WITNESSES: Gustave Dieterich.
INVENTOR
Paul G. Mehlin
BY Briesen J Knauth
ATTORNEYS No. 649,066. Patented May 8, 1900.
P. G. MEHLIN.
PIANO.
(Application filed Oct. 17, 1899.)
(No Model.) 2 Sheets—Sheet 2.
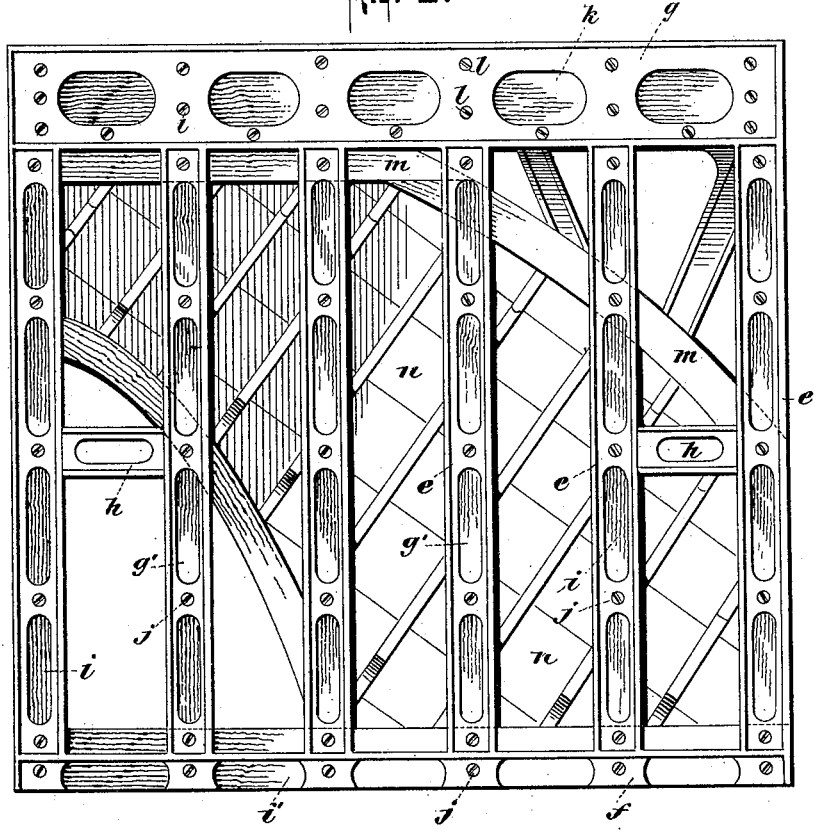
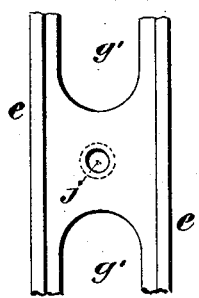
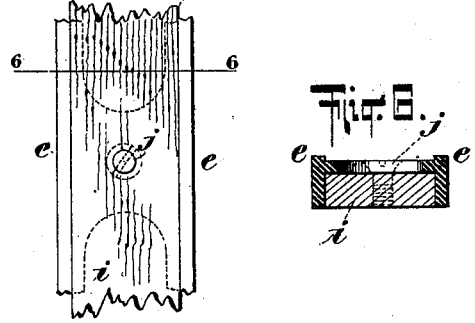
WITNESSES:
INVENTOR
Paul G. Mehlin
BY Briesen & Knauth
ATTORNEYS
THE NORRIS PETERS CO., PHOTO-LITHO., WASHINGTON, D. C.

UNITED STATES PATENT OFFICE.

PAUL G. MEHLIN, OF NEW YORK, N. Y.

PIANO.

SPECIFICATION forming part of Letters Patent No. 649,066, dated May 8, 1900.

Application filed October 17, 1899. Serial No. 733,900. (No model.)

*To all whom it may concern:*

Be it known that I, PAUL G. MEHLIN, a citizen of the United States, residing in the borough of Manhattan, city, county, and State of New York, have invented certain new and useful Improvements in Pianos, of which the following is a specification.

My invention relates to improvements in pianos, and has for its object to produce a piano wherein the volume of sound will be greatly augmented and delivered toward the front of the piano, so as to avoid disturbing the neighbors.

In the accompanying drawings I have illustrated a piano in which my invention is embodied, it being understood that the said drawings are illustrative merely and that I do not mean to confine myself to the construction shown.

In the drawings, Figure 1 is a front view of a sufficient number of the parts of my improved piano to clearly illustrate my invention, the said figure showing the sounding-board and the wrest or back. Fig. 2 is a section on the line 2 2 of Fig. 1 and in addition to what is shown in Fig. 1 shows a string-plate. Fig. 3 is a rear view of the wrest or back. Fig. 4 is an enlarged detached detail view of one of the channeled stiles of the wrest or back. Fig. 5 is a view similar to Fig. 4, showing the wooden rail in place in the stile; and Fig. 6 is a section on the line 6 6 of Fig. 5.

In the drawings, $a$ is the base of the piano-case. $b$ is the front of the case. $c$ is the hinged top of the case, and $d$ is the back of the case, it being understood that this back is preferably imperforate in order to reflect and reinforce the sound in a manner to be hereinafter described. Within this case are mounted the wrest or back, the sounding-board, and the string-plate. The piano-actions are also mounted in the said case, but are not shown in the drawings. The wrest or back of the piano is of peculiar and novel construction. A rear view of the same is shown in Fig. 3 of the drawings. This wrest or back consists of a skeleton frame, preferably of the form shown in the drawings and constructed of a series of upright channeled bars $e$, a base or bar $f$, and a wide top bar $g$. The entire frame is preferably made integral of cast-iron, the uprights or stiles $e$ and the top and bottom pieces being grooved or channeled and cut away, as at $g'$, in order to make a very rigid yet light frame. Suitably-channeled cut-away cross-pieces $h$ may likewise be employed. In the grooves or channels of the stiles and of the bottom piece $f$ bars of hard wood $i$ are tightly fitted and suitably secured therein—for instance, by means of the screws $j$. I likewise insert into the channel of the transverse top bar $g$ a wooden wrest-plank $k$, suitably secured therein by screws $l$ or other suitable securing means. This wrest-plank $k$ receives the tuning-pins in the usual manner. To the wrest or back thus constructed I glue (preferably all of veneers) a suitable thickness of wood shaped according to the desired outline of the sound-board, giving enough vibrating power to the sound-board. This thickness of wood just described constitutes the connection between the sound-board and wrest or back and is indicated in the drawings by the letter $m$. On this connection I then glue the sound-board, as is usual. This sound-board is indicated in the drawings by the letter $n$, and instead of being the usual construction is cut away to fit the contour of the string-plate, as will be described. The sounding-board $n$ is secured to the parts $m$ by the intermediate strips $o$ at the top and bottom. The wrest or back preferably does not extend up entirely to the top of the case, but leaves above the same a free passage or opening $p$ and at the sides thereof free passages or openings $q$. At each side of the sounding-board, at the places where it is cut away, large openings $r$ $s$ are thus provided, so that the sound-board is surrounded on all sides by a body of air, so that by means of the chamber $t$ at the rear of the said sounding-board and the openings $r$ and $s$ and the opening $p$ the volume of sound will be greatly augmented and thrown out to the front of the instrument, thereby localizing the sound and preventing the same from annoying the neighbors. The tone of the vibrating strings will not escape to the rear of the piano by reason of the solid back $d$ and the air-spaces, which envelop and entirely surround the sound-board. The string-plate $u$ is secured to the wrest-plank $k$ and batten $w$ and is shaped so as to conform to the shape of the sounding-board $n$. The parts just described are bolted together by suitable bolts and placed in the case in an inclined position. Brackets $x$ on the arms $y$ are secured to the string-plate to aid in supporting the same in position.

It will be observed that by the construction mentioned I obtain a considerable air space or column both in the front of and in the rear of the sounding-board, which air spaces or columns communicate by means of the apertures $r$ $s$ and over the wrest or plate by the aperture $p$, and thus constitute a resonant sound-box for reinforcing the sound.

Having described my invention, what I claim, and desire to secure by Letters Patent, is—

1. In a piano, the combination of an open or framework wrest or back, a sounding-board supported in proximity thereto, the said sounding-board covering a part only of the wrest or back and leaving at its sides passages for the passage of sound-waves and a casing enveloping the said wrest or back and sounding-board, the said casing providing air-columns at the front and rear of the sounding-board and an air-passage over the wrest or back within the casing whereby the case of the piano will provide a free and unobstructed air-body or air-resonance box entirely surrounding the sounding-board.

2. In a piano, the combination of a back or wrest having the upright channeled metallic stiles $e$ and the wooden rails $j$ secured therein and a sounding-board secured to the said rails by a wooden connection.

3. In a piano, the combination of an open wrest or back, a case surrounding the said wrest or back, the said wrest or back being of less height than the interior of the case so as to leave above the same an air-space for the easy passage of sound and a sound-board of less extent than said wrest or back mounted thereon.

4. A wrest or back for pianos consisting of an integral casting provided with upright and longitudinal channels the webs whereof are provided with apertures $g'$ and wooden rails and a wooden wrest-plate secured in the said channels and adapted to form supports for the sounding-board and for the tuning-pins.

5. In a piano, the combination of an open back set in an inclined position, a sounding-board cut away at its sides so as to be of less extent than the back, supported by the said back in an inclined position, a casing on the base of which the said back is mounted, the said casing entirely surrounding the said back and leaving spaces between the sides of the casing and the sides of the back and the top of the casing and the top of the back.

6. In a piano, the combination of a casing having a base $a$, a sounding-board supported by a support rigidly secured to the said base of the said piano, the said sounding-board being entirely surrounded by the casing and leaving apertures $r$ $s$ at the sides, the said support for the sounding-board being in the nature of an open back, whereby the passage of air from the front to the back of the piano-casing will be entirely unobstructed.

PAUL G. MEHLIN.

Witnesses:
GEO. E. MORSE,
CHARLES E. SMITH.